United States Patent
Ajitomi et al.

(10) Patent No.: US 7,583,685 B2
(45) Date of Patent: Sep. 1, 2009

(54) GATEWAY DEVICE, NETWORK SYSTEM, COMMUNICATION PROGRAM, AND COMMUNICATION METHOD

(75) Inventors: Daisuke Ajitomi, Yokohama (JP); Keiichi Teramoto, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 540 days.

(21) Appl. No.: 11/271,850

(22) Filed: Nov. 14, 2005

(65) Prior Publication Data

US 2006/0133392 A1 Jun. 22, 2006

(30) Foreign Application Priority Data

Nov. 24, 2004 (JP) ............................. 2004-339337

(51) Int. Cl.
*H04L 12/46* (2006.01)
(52) U.S. Cl. .................................................. 370/401
(58) Field of Classification Search ................ 370/352, 370/354, 356, 395.52, 401
See application file for complete search history.

(56) References Cited

U.S. PATENT DOCUMENTS

| 6,707,809 | B1 * | 3/2004 | Warrier et al. | 370/351 |
| 2003/0100962 | A1 * | 5/2003 | Sumita et al. | 700/65 |
| 2005/0232283 | A1 * | 10/2005 | Moyer et al. | 370/401 |

* cited by examiner

*Primary Examiner*—Chirag G Shah
*Assistant Examiner*—Yong Zhou
(74) *Attorney, Agent, or Firm*—Oblon, Spivak, McClelland, Maier & Neustadt, P.C.

(57) ABSTRACT

A communication method includes; generating identification information for identifying each of detected appliances on a second network; classifying the generated identification information; publishing for a terminal device on a first network a list of the identification information; upon receipt of a request for call connection with identification information on the published list from the terminal device on the first network, establishing call connection with the terminal device; and mediating communication between the terminal device and an appliance on the second network assigned the identification information.

13 Claims, 14 Drawing Sheets

| DISPLAY NAME (display-name) | EXTERNAL PUBLIC ADDRESS (GRUU) | INTERNAL ADDRESS (Contact-URI) | AOR | APPLIANCE IDENTIFIER (Instance-ID) | RESOURCE LIST |
|---|---|---|---|---|---|
| Printer:1 | sip:printer-1.aidyl107wlw73@sip-example.com | 192.168.0.77:8000 | rc-user@sip-example.com | kb2347re-3489-87d2-1000-090444e39817 | UPnP-Appliances |
| MediaServer:2 | sip:mediaserver-2.hha678djl723a@sip-example.com | 192.168.0.52:8000 | rc-user@sip-example.com | db65c184-7767-11b8-8000-080044d86765 | UPnP-Appliances |
| Refrigerator-RF463JP | sip:refrigerator-gr463it.mkidyo297389s@sip-example.com | 192.168.10.38:8888 | rc-user@sip-example.com | 10037A017C7B | ECHONET-Appliances |
| AirConditioner-AC100JP | sip:airconditioner-ac100jp-kkirufa12a135@sip-example.com | 192.168.10.46:8888 | rc-user@sip-example.com | 10037A014B91 | ECHONET-Appliances |
| DigitalTV-DT777JP | sip:dtv.apsyukl234734adfd@sip-example.com | sip:dtv.apsyukl234734adfd@192.168.0.55 | rc-user@sip-example.com | 000345a1b2c3 | SIP-Appliances |

FIG. 2

| EXTERNAL PUBLIC ADDRESS OF GATEWAY DEVICE(GRUU) | IP ADDRESS/PORT NUMBER OF GATEWAY DEVICE | PRESENCE INFORMATION OF GATEWAY DEVICE |
|---|---|---|
| sip:gateway.aidyl107wlw73@sip-example.com | 222.33.44.55.8000 | PIDF (EXTENDED) INFORMATION, etc |

FIG. 11

GATEWAY DEVICE, NETWORK SYSTEM, COMMUNICATION PROGRAM, AND COMMUNICATION METHOD

CROSS-REFERENCE TO RELATED APPLICATIONS

This application claims the benefit of priority under 35USC §119 to Japanese Patent Application No. 2004-339337 filed on Nov. 24, 2004, the entire contents of which are incorporated herein by reference.

BACKGROUND OF THE INVENTION

1. Field of the Invention

The present invention relates to a gateway device, network system, communication program, and communication method.

2. Related Art

In recent years, broadband environments which allow constant connection from home to the Internet are becoming popular along with the prevalence of ADSL and FTTH. Preferred examples of services using such a broadband environment include IP telephone services which are now rapidly becoming widespread. With such an IP telephone service, users can perform voice and video communication through the Internet.

Turning to a home local network, appliances equipped with a network interface have emerged among not only personal computers but also consumer appliances such as white goods or AV appliances and have begun to form a so-called home network. With this trend, development of a standard for control protocols is under way to allow interconnection between these consumer appliances. Typical examples of these control protocols are UPnP (Universal Plug and Play) which uses a TCP/IP network built on an IEEE (Institute of Electrical and Electronics) 802 network, AV/C used on an IEEE1394 high-speed serial bus, and ECHONET® available on various communication networks.

UPnP is an international standard protocol mainly aimed at interconnecting a personal computer, its peripherals, and a network appliance such as a router. The scope of interconnection is now expanding to AV appliances, and standardization of AV appliances is under way.

An IEEE1394 high-speed bus network is one targeted at AV appliances, and AV/C used on this network is a standard for protocols which send and receive control commands for AV appliances.

ECHONET is a domestic standard for control protocols targeted at white goods, sensors, and equipment. ECHONET is expected to be used in various communication networks such as IEEE802, Bluetooth®, infrared, power line, and low-power wireless networks.

Appliances compliant with UPnP, AV/C, and ECHONET protocols can be interconnected through a network and can be separately controlled. Currently, appliances compliant with these control protocols are already commercialized and are beginning to spread. At the same time, there are growing expectations for services which allow free control of these appliances from outside a home. However, a remote control service cannot generally be implemented just by using control protocols at home from outside the home without any conversion. This is because according to specifications, the control protocols are premised on use in a LAN (Local Area Network) and have a function dependent on broadcast communication or multicast communication. It is impractical to expand the scope of the control protocols to an out-of-home network (external network) serving as a public network without any processing.

To implement a remote control service for home appliances, there can be considered a method of making a gateway device lie between an out-of-home network and a home network. In this case, the gateway device converts a control command packet from the external network into a control protocol at home as described above and sends the packet to a target appliance.

For example, if HTTP (Hyper Text Transfer Protocol) is used as a transport protocol on the out-of-home network, an HTTP server is installed on the gateway device, and an operational terminal on the out-of-home network sends a control command to a remote control program on the gateway device through an HTTP GET or POST method. The remote control program is uniquely identified by its URL (Uniform Resource Locator), and its substance is CGI (Common Gateway Interface), Java Servlet, or the like. The remote control program on the gateway device acquires the control command from the received HTTP request, recognizes a target home appliance, converts the control command into a control protocol with which the home appliance complies, and sends a control command packet. The target appliance processes the received control command packet and sends in return the processing result to the remote control program on the gateway device on the basis of the control protocol. The gateway device sends in return the response result as an HTTP response to the operational terminal on the out-of-home network having sent the control command. The above-described procedure implements control of an electronic appliance on a home network from an operational terminal on an out-of-home network. It can be said that this example using HTTP is adapted to a conventional use pattern of the Internet. However, the gateway device needs to wait while keeping a port open to accept a service in response to a unilateral request from an arbitrary operational terminal on the out-of-home network, and this state is problematic in terms of security. Also, an application on the HTTP server needs to be changed to support a new appliance or control protocol, and the scalability is poor.

As another example which implements a remote control service using a gateway device, there is a method of performing communication by call connection on an out-of-home network. More specifically, the same method as that for IP telephony is used for communication between a control terminal outside a home and a gateway device. For example, SIP (Session Initiation Protocol) can be used for call connection. The control terminal sends a SIP INVITE message to the gateway device via a SIP proxy or SIP server and requests establishment of a communication session. The gateway device determines whether to receive the INVITE message. If the gateway device determines to receive the INVITE message, it sends a 200 OK response in response to the INVITE message. If the operational terminal side notifies the gateway device through an ACK message that it has received the 200 OK response, a communication session is established between the operational terminal and the gateway device. Since at this time, the gateway device can find an IP address and port number of the operational terminal, it can deny access from an unknown client and can deny all communications with a partner with which no session is established. Also, the opening of a port after session establishment makes it possible to prevent unauthorized access and improve security. To implement remote control using SIP like this example, there can be considered a method that uses a MESSAGE method and INFO method which are SIP extensions to send a control command. In this case, examples of a method of designating a target appliance can include a method of including appliance identification information in a BODY message of the method, and a method in which a gateway device gives a SIP URI to a home appliance and makes the home appliance open as a virtual SIP-compliant appliance, which causes an operational terminal on an out-of-home network to separately send the SIP method to the virtual SIP-compliant appliance.

There are several advantages in implementing remote control using call connection, in addition to that in terms of security described above.

For example, one of the advantages lies in that the implementation has a high affinity for and is compatible with IP telephone systems as described at the beginning. Since IP telephones are rapidly spreading, incorporation of the above-described technique into these systems makes it possible to implement remote control of home appliances without the need to separately prepare a special remote control system and expect its prevalence. The IMS (IP Multimedia Subsystem) being developed by the 3GPP (3rd Generation Partnership Project) which is a standardization body for third generation mobile telephony is premised on use of SIP, and thus the above-described method has a high affinity for the standard on an operational terminal side.

An advantage that SIP extended functions can be used is also important. A presence function which checks the state and capabilities of a communication partner and an event notification function which asynchronously notifies a change in appliance state are functions necessary for implementing remote control of home appliances. These functions are being standardized as SIP extensions. Accordingly, these functions need not be separately prepared to implement a remote control service.

An example of a technique related to a gateway device which assumes an external network that establishes call connection to perform communication is disclosed in Japanese Patent Laid-Open No. 2004-187149. As a paper describing a method of implementing remote control of home appliances by using SIP to establish a session with an external network and using UPnP or X10 for a home network, there is one entitled "Instant Messaging and Presence for Network Appliances using SIP" by Stan Moyer in Internet Telephony Workshop 2001.

The gateway device referred to in each of these documents includes a method of sending a control command from an appliance on an out-of-home network to a target device connected to a home network and a method of notifying the appliance on the out-of-home network of a state change event from the appliance connected to the home network. The former control command transmission method on the out-of-home network is implemented through a MESSAGE method and INFO method which are SIP extensions. The latter event notification method uses a SUBSCRIBE method and NOTIFY method which are also SIP extensions.

The gateway device referred to in Japanese Patent Laid-Open No. 2004-187149 makes mention of a method of transmitting a control command and event information but does not show a setting method which allows control of a home appliance from an out-of-home network. Home appliances are intended for users of a wide age group, unlike personal computers. Thus, it is desirable to prevent, as far as possible, a user from being forced to perform complicated work such as network setting for allowing remote control. A function which automatically allows operation of a home appliance from an out-of-home network just by connecting the home appliance to a home network (plug and play function) is necessary.

Also, Japanese Patent Laid-Open No. 2004-187149 does not show a method of coping with a case wherein there are a plurality of control protocols at home. There is a possibility that a plurality of control protocols such as UPnP, ECHONET, and AV/C are mixed with each other on a home network. Alternatively, there can be considered a case wherein a SIP-compliant appliance is present, and communication premised on call connection is performed even in a home network. It is also important to implement the plug and play function in a framework which can accommodate various control protocols.

Finally, as a method of implementing a remote control service, there can be considered a use case wherein a list of appliances available at home is acquired, and an individual one is selected from the appliances. There can also be considered a case wherein it is desired to acquire, at a time, the power states of all appliances at home. However, assuming a situation wherein a global network address is given to each home appliance due to, e.g., possible prevalence of IPv6 (Internet Protocol Version 6) or the above-described situation wherein a plurality of control protocols are mixed with each other on a home network, a special solution is required to group home electric appliances by home unit as an "appliance which belongs to a home." To prevent a user to perform complicated setting operation, it is desired to automatically perform grouping. More specifically, as part of plug and play processing, it is necessary to implement grouping of home appliances.

SUMMARY OF THE INVENTION

According to an aspect of the present invention, there is provided a gateway device which connects a first network and at least one second network and performs communication based on a call control protocol with a terminal device on the first network, comprising: a connection detecting unit which detects appliances on the second network; an identification information generator which generates identification information for identifying by the call control protocol each of the detected appliances; a classification unit which classifies the generated identification information according to at least either a type of a control protocol with which the detected appliances on the second network comply or a type of the second network to which the detected appliances belong; a storage unit which storages the classified identification information; an information publishing unit which, upon receipt of an information subscription request according to the call control protocol from the terminal device on the first network, publishes for the terminal device on the first network a list of the identification information classified according to the at least either the type of the control protocol or the type of the second network; a call connection unit which, upon receipt of a request for call connection with identification information on the published list according to the call control protocol from the terminal device on the first network, establishes call connection with the terminal device having made the request for call connection; and a mediation unit which mediates communication between the terminal device having made the request for call connection and an appliance on the second network assigned the identification information serving as a target of the request for call connection.

According to an aspect of the present invention, there is provided a network system comprising: a gateway device which connects a first network and at least one second network and performs communication based on a call control protocol with a terminal device on the first network; and a server device connected to the first network to register an appliance participant in communication based on the call control protocol, the gateway device including a connection detecting unit which detect appliances on the second network, an identification information generator which generates identification information for identifying by the call control protocol each of the detected appliances, a classification unit which classifies the generated identification information according to at least either a type of a control protocol with which the detected appliances on the second network comply or a type of the second network to which the detected appliances belong, a storage unit which storages the classified identification information, an information publishing unit which, upon receipt of an information subscription request according to the call control protocol from the terminal device on the first network, publishes for the terminal device on the first network a list of the identification information classified according to the at least either the type of the control protocol or the type of the second network, a call connection unit which, upon receipt of a request for call connection with identification information on the published list according to the call control protocol from the terminal device on the first network, establishes call connection with the terminal device having made the request for call connection, and a mediation unit which mediates communication between the terminal device having made the request for call connection and an appliance on the second network assigned the identification information serving as a target of the request for call connection, the server device including a gateway specifying unit which, upon receipt of a unicast packet from the appliance on the second network which performs communication based on the call control protocol for requesting registration of the appliance, specifies a gateway device to which the appliance on the second network belongs, and a transfer unit which sends out, to the appliance on the second network, instruction data giving an instruction to request the registration to the specified gateway device, wherein the connection detecting unit in the gateway device detects the appliance on the second network by receiving a unicast packet for requesting the registration from the appliance on the second network.

According to an aspect of the present invention, there is provided a communication program for executing in a gateway device which connects a first network and at least one second network and performs communication based on a call control protocol with a terminal device on the first network, comprising: detecting appliances on the second network; generating identification information for identifying by the call control protocol each of the detected appliances; classifying the generated identification information according to at least either a type of a control protocol with which the detected appliances on the second network comply or a type of the second network to which the detected appliances belong; upon receipt of an information subscription request according to the call control protocol from the terminal device on the first network, publishing for the terminal device on the first network a list of the identification information classified according to the at least either the type of the control protocol or the type of the second network; upon receipt of a request for call connection with identification information on the published list according to the call control protocol from the terminal device on the first network, establishing call connection with the terminal device having made the request for call connection; and mediating communication between the terminal device having made the request for call connection and an appliance on the second network assigned the identification information serving as a target of the request for call connection.

According to an aspect of the present invention, there is provided a communication method of implementing in a gateway device which connects a first network and at least one second network and performs communication based on a call control protocol with a terminal device on the first network, comprising: detecting appliances on the second network; generating identification information for identifying by the call control protocol each of the detected appliances; classifying the generated identification information according to at least either a type of a control protocol with which the detected appliances on the second network comply or a type of the second network to which the detected appliances belong; upon receipt of an information subscription request according to the call control protocol from the terminal device on the first network, publishing for the terminal device on the first network a list of the identification information classified according to the at least either the type of the control protocol or the type of the second network; upon receipt of a request for call connection with identification information on the published list according to the call control protocol from the terminal device on the first network, establishing call connection with the terminal device having made the request for call connection; and mediating communication between the terminal device having made the request for call connection and an appliance on the second network assigned the identification information serving as a target of the request for call connection.

BRIEF DESCRIPTION OF THE DRAWINGS

FIG. 2 is a table showing an example of a format of appliance information according to the first embodiment of the present invention;

FIG. 11 is a table showing an example of a format of gateway information stored in a SIP server device according to the fourth embodiment of the present invention;

DETAILED DESCRIPTION OF THE INVENTION

First Embodiment of Present Invention

Figure 1:
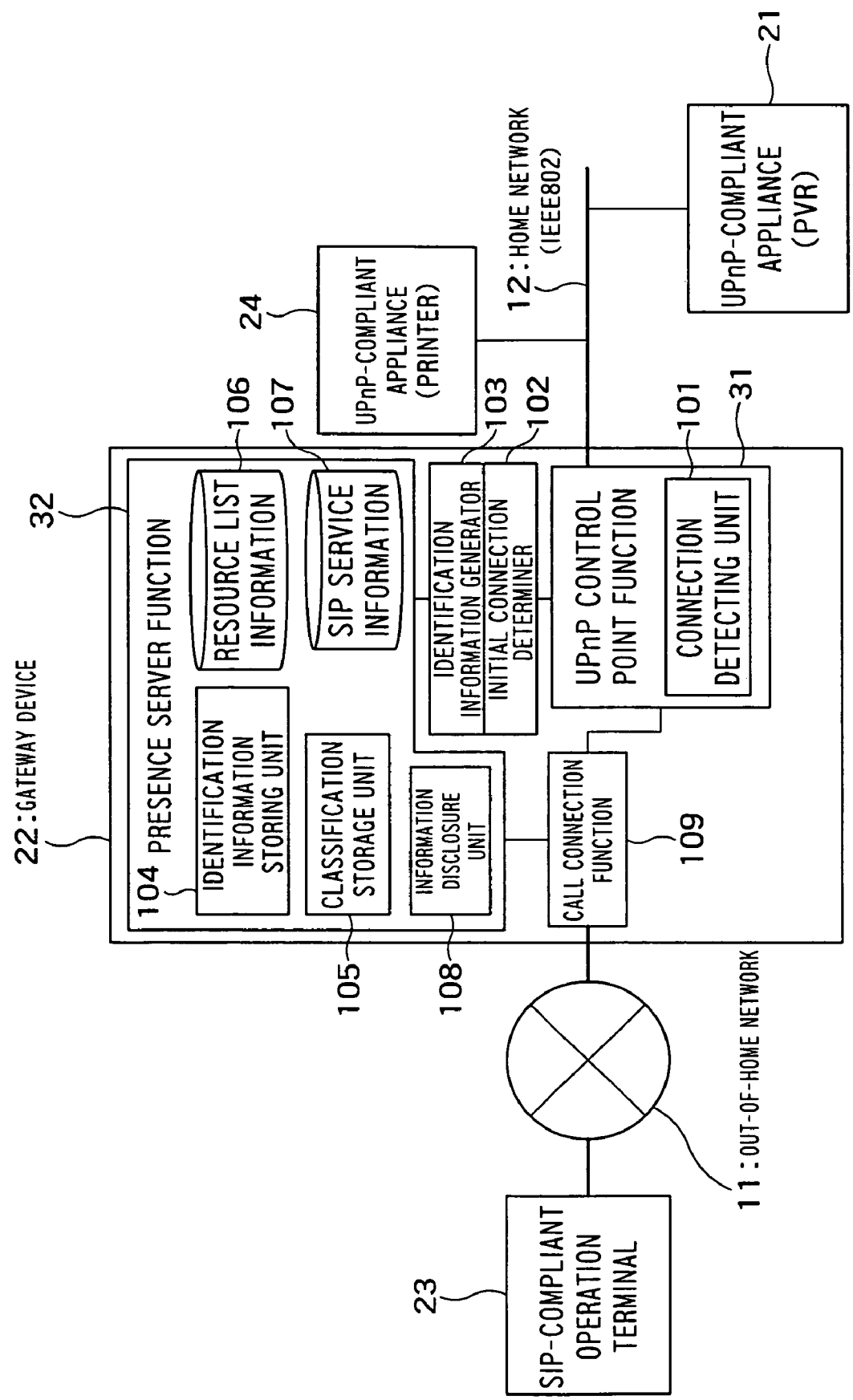
FIG. 1 is a diagram of a network configuration in which a gateway device according to a first embodiment of the present invention is used.

FIG. 1 is a diagram showing a network configuration in which a gateway device according to a first embodiment is used.

For example, the Internet is assumed as an out-of-home network 11.

A home network 12 is an IEEE802 network to which a PVR (UPnP-compliant appliance) 21 and printer (UPnP-compliant appliance) 24 compliant with a UPnP protocol are connected.

A gateway device 22 associated with the present invention lays between the out-of-home network 11 and the home network 12.

When the PVR 21 is connected to the home network 12, it sends an SSDP (Simple Service Discovery Protocol) alive packet below on the basis of a UPnP protocol specification.

```
NOTIFY * HTTP/1.1
HOST: 192.168.0.100:1900
CACHE-CONTROL: max-age = 60
LOCATION: http://192.168.0.100:51001/MediaServerGen.xml
NT: urn:schemas-upnp-org:service:MediaServer:2
NTS: ssdp:alive
SERVER: XXX Linux/2.1 UPnP/1.0 XXX Corp/1.0.0
USN:uuid:db65c184-7767-11b8-8000-080044d86765::urn:schemas-
upnp-org:service:MediaServer:2
```

A connection detecting unit 101 of a UPnP Control Point function 31 in the gateway device 22 recognizes by receiving the SSDP alive packet that the PVR 21 is connected to the home network 12.

The gateway device 22 also recognizes by means of an initial connection determiner 102 whether the PVR 21 is connected for the first time. The gateway device 22 determines this from whether appliance information of the PVR 21 is already registered in itself and, more specifically, whether the PVR 21 is contained in resource list information (Resource List Document) 106 or a classification storage unit 105 (to be described later).

If it is determined that the PVR 21 is an appliance connected for the first time, an identification information generator 103 in the gateway device 22 acquires the UUID (Universally Unique Identifier) value in the USN header. The identification information generator 103 generates a GRUU (Globally Routable UA URI) using the UUID value and an AOR (Address Of Record) given to a user who uses a SIP domain and stores the GRUU in an identification information storing unit 104 in a presence server function 32.

A GRUU is like an AOR for a user and is a SIP address assigned to a SIP appliance. A GRUU is used to uniquely specify a SIP appliance in a global environment. To generate a GRUU, there can be considered a method of calculating a hash value from a combination of an AOR string and a UUID string and forming a GRUU by concatenating the hash value, "@," and a domain string, a method of encrypting the combination of the AOR string and the UUID string and forming a GRUU by concatenating the encrypted value, "@," and the domain string, and the like. To make a UPnP appliance look like a virtual SIP appliance as in the first embodiment, a GRUU by which a user can specify a model may be generated using a deviceType string contained in a Device Description Document describing a UPnP appliance. A generated example of readable identification information will be given. There can be considered a method of generating a GRUU as "mediaserver-2.hha678djl723a@sip-example.com" if a deviceType of the PVR 21 which is a UPnP appliance is "urn:schemas-upnp-org:service:MediaServer:2," a hash value of a string obtained by combining an AOR string and a UUID string is "hha678djl723a," and a domain name is "sip-example.com".

The gateway device 22 registers the GRUU in the resource list information 106 in the presence server function 32 and manages the GRUU. This makes it possible to consider, as a virtual SIP appliance, the PVR 21 which is a UPnP appliance and allows a SIP-compliant operation terminal 23 on the out-of-home network 11 to access the PVR 21. More specifically, an information disclosure unit 108 of the presence server function 32 in the gateway device 22 considers, as a virtual SIP instance, the PVR 21 which is a non-SIP-compliant appliance and makes the instance open to the out-of-home network 11 using a SIP presence mechanism.

As a method of concretely implementing the information disclosure unit 108, the gateway device 22 uses two types of XML documents to associate a SIP address assigned to an appliance on the home network 12 with a remote control service. The first document is one which describes a list of SIP resources and is called the resource list information (Resource List Document) 106. The second document is one which defines a relationship between services and resource lists associated with the services and is called SIP service information (RLS (Resource List Server) Services Document) 107. The SIMPLE (SIP for Instant Messaging and Presence Leveraging Extensions) working group of the IETF (Internet Engineering Task Force) engaged in the development of a SIP extended specification for a presence function is proceeding with standardization of description formats for these documents.

For example, the GRUU assigned to the PVR 21 is contained in the resource list information (Resource List Document) 106 in the following manner.

```
<?xml version="1.0" encoding="UTF-8"?>
<resource-lists xmlns="urn:ietf:params:xml:ns:resource-lists"
  xmlns:xsi="http://www.w3.org/2001/XMLSchema-instance">
  <list name="home-appliances">
  <display-name>Home Appliances</display-name>
    <list name="upnp-appliances">
      <display-name>UPnP Appliances</display-name>
      <entry
uri="sip:printer-1.aidyl107wlw73@sip-example.com">
        <display-name>Printer:1</display-name>
      </entry>
      <entry                                       uri="sip:
mediaserver-2.hha678djl723a@sip-example.com">
        <display-name>MediaServer:2</display-name>
      </entry>
    </list>
    <list name="echonet-appliances">
    <display-name>ECHONET Appliances</display-name>
      <entry
```

-continued

```
uri="sip:refrigerator-gr463it.mkidyo297389s@sip-example.com"
>
    <display-name>Refrigerator-RF463JP</display-name>
    </entry>
    <entry
uri="sip:airconditioner-ac100jp-kkirufa12a135@sip-example.com">
    <display-name> AirConditioner-AC100JP</display-name>
    </entry>
</list>
<list name="sip-appliances">
    <display-name>SIP Appliances</display-name>
    <entry uri="sip:dtv.apsyukl234734adfd@sip-example.com">
    <display-name>DigitalTV-DT777JP</display-name>
    </entry>
</list>
</list>
</resource-lists>
```

In this example of the resource list information (Resource List Document), a printer compliant with the UPnP protocol, a refrigerator and air conditioner compliant with an ECHO-NET protocol, and a digital television equipped with a SIP-based communication function are registered in addition to the PVR 21. Appliances connected to the home network 12 are contained in a resource list named "Home Appliances." Each of the home appliances is registered in one of "UPnP Appliances," "ECHONET Appliances," and "SIP Appliances" resource lists with smaller granularity according to the control protocol with which the home appliance complies. Each appliance is registered in a corresponding resource list when, e.g., it is determined that the appliance is initially connected. At this time, information on the appliance is registered in a classification table in a format shown in FIG. 2. Generation and storage of this classification table are performed by the classification storage unit 105.

As shown in FIG. 2, appliance information on each appliance includes a display name of the appliance, an external address for accessing the appliance (GRUU generated by the identification information generator 103), an internal address for accessing the appliance (Contact URI), an AOR, an identifier unique to the appliance, and information on a corresponding control protocol (resource list to which the appliance belongs). Besides this, additional information such as position information may be added.

By including home appliances in resource lists organized by control protocol, a control command packet generated by the SIP-compliant operation terminal 23 on the out-of-home network 11 can be easily linked to an application which converts the packet into an appropriate control protocol in the presence server function 32 in the gateway device 22. This is implemented by using the second document, i.e., the SIP service information (RLS Services Document) 107. The gateway device 22 prepares the following SIP service information (RLS Services Document).

```
<?xml version="1.0" encoding="UTF-8"?>
<rls-services xmlns="urn:ietf:params:xml:ns:rls-services"
    xmlns:rl="urn:ietf:params:xml:ns:resource-lists"
    xmlns:xsi="http://www.w3.org/2001/XMLSchema-instance">
    <service uri="sip:presence.asdfads23r23r@sip-example.com">
    <resource-list>http://xcap.example.com/resource-lists/users/sip-
    example/index/~~/resource-lists/list[@name="home-appliances"]
    </resource-list>
```

```
    <packages>
        <package>presence</package>
    </packages>
    </service>
    <service uri="sip:upnp-rc.asdfads23r23r@sip-example.com">
    <resource-list>http://xcap.example.com/resource-lists/users/sip-
    example/index/~~/resource-lists/list[@name="upnp-appliances"]
    </resource-list>
    <packages>
        <package>upnp-rc</package>
    </packages>
    </service>
    <service
uri="sip:echonet-rc.asdfads23r23r@sip-example.com">
    <resource-list>http://xcap.example.com/resource-lists/users/sip-
    example/index/~~/resource-lists/list[@name="echonet-appliances"]
    </resource-list>
    <packages>
        <package>echonet-rc</package>
    </packages>
    </service>
</rls-services>
```

This SIP service information (RLS Services Document) defines "presence," "upnp-rc (Remote Control)," and "echonet-rc" services corresponding to the resource lists, "home-appliances," "upnp-appliances," and echonet-appliances" defined in the resource list information (Resource List Document). The presence server function 32 in the gateway device 22 can implement processing according to each of control protocols on the home network 12 by being equipped with applications corresponding to these services.

Figure 3:
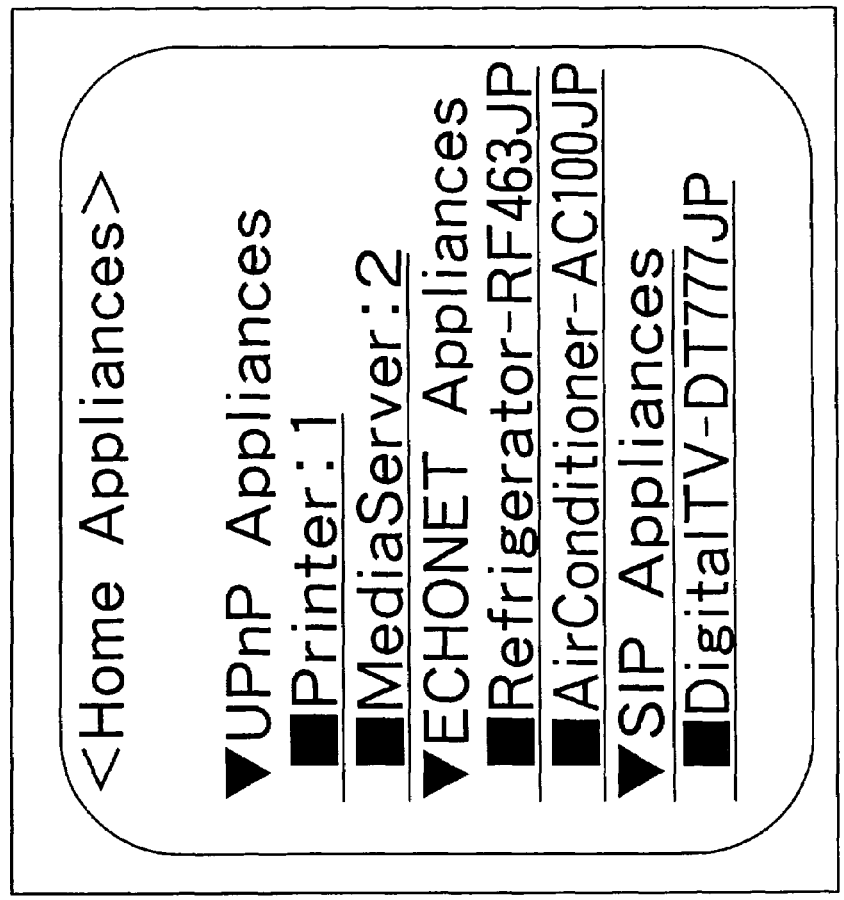
FIG. 3 is a view showing a display example of presence information of home appliances according to the first embodiment of the present invention.

The gateway device 22 automatically generates the two documents 106 and 107 at the time of initial activation and inserts information on the UPnP appliance (PVR 21) connected to the home network 12 into an appropriate resource list (in this example, "upnp-appliances") described in the resource list information (Resource List Document). This makes it possible to make the UPnP appliance open to the external network 11 as a virtual SIP-compliant appliance. The SIP-compliant operation terminal 23 on the out-of-home network 11 makes a request to the gateway device 22 and acquires information on the PVR 21 in a SIP framework. With this operation, the SIP-compliant operation terminal 23 becomes able to access the UPnP appliance on the basis of the acquired information. FIG. 3 shows an example wherein the resource list information (Resource List Document) is displayed as presence information on a display screen of the SIP-compliant operation terminal 23 on the out-of-home network 11.

A call connection function 109 in the gateway device 22 establishes call connection with the SIP-compliant operation terminal 23 in response to a request for call connection with a GRUU from the SIP-compliant operation terminal 23 connected to the out-of-home network 11. The gateway device 22 mediates communication (including protocol conversion) between the SIP-compliant operation terminal 23 with which it has established the call connection and the UPnP-compliant appliance related to the request for call connection.

This embodiment focuses on a plug and play function for allowing access to an electronic appliance from the outside just by connecting the electronic appliance to a home network and thus does not refer to the details of a method of implementing remote control itself. However, specifications being developed by the SIMPLE working group and the like can be used.

The GRUU generation method and description formats for the resource list information (Resource List Document) and SIP service information (RLS Services Document) according to the first embodiment are techniques under standardization by the IETF. This embodiment is characterized by the following point. When a gateway device receives an SSDP alive packet, it determines whether an appliance is connected for the first time. If the gateway device determines that the appliance is newly connected, it classifies the appliance by control protocol (e.g., UPnP or ECHONET) and registers the appliance in a presence server (gateway device itself) as accessible information in a SIP framework.

Figure 4:
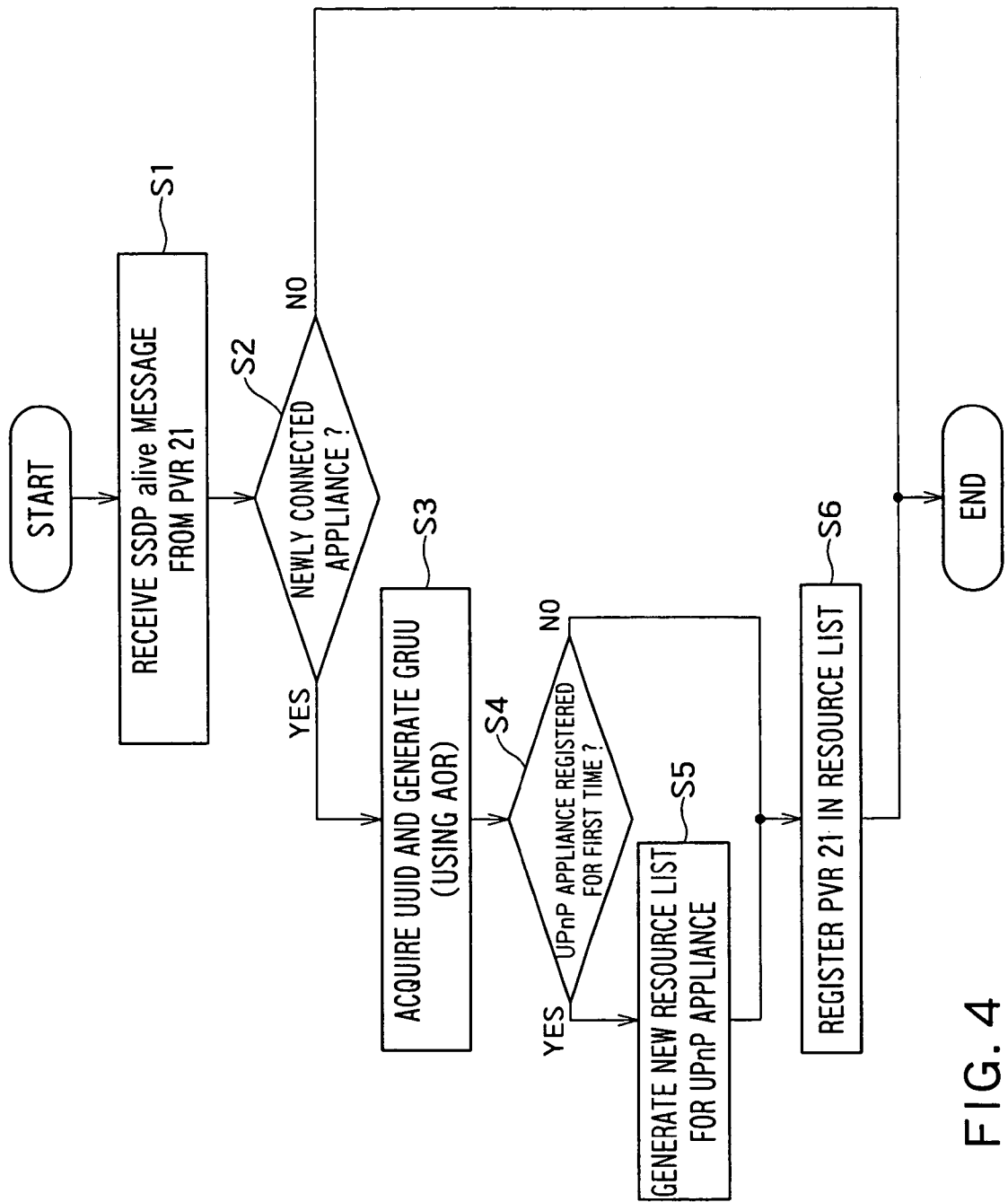
FIG. 4 is a flowchart for explaining operation of the gateway device according to the first embodiment of the present invention.

FIG. 4 shows an operation sequence of the gateway device according to the first embodiment.

When the connection detecting unit 101 in the gateway device 22 receives an SSDP alive message from the PVR (UPnP-compliant appliance) 21 (step S1), it determines on the basis of, e.g., the resource list information 106 whether a new appliance is connected onto the home network 12 (step S2).

If no new appliance is connected, i.e., an appliance in question is already registered in the resource list information 106, the process ends (NO in step S2). On the other hand, if it is determined that a new appliance is connected (YES in step S2), the identification information generator 103 acquires a UUID from the received message and generates a GRUU (step S3). The identification information generator 103 registers the generated GRUU in the identification information storing unit 104.

The presence server function 32 determines whether the newly detected appliance is a first UPnP appliance. More specifically, the presence server function 32 determines whether a resource list for UPnP ("upnp-appliances") is registered in the resource list information 106 or classification storage unit 105 (step S4).

If the resource list for UPnP is not yet present in the resource list information 106 or classification storage unit 105 (YES in step S4), a new resource list for UPnP appliances is generated, and the generated resource list is added to the resource list information 106 (step S5).

After that, or if the resource list for UPnP is already registered in step S4 (NO in step S4), the presence server function 32 registers the newly detected PVR 21 in the UPnP resource list in the resource list information 106 (step S6). Also, the classification storage unit 105 adds information on the PVR 21 to the classification table (step S6).

Effects obtained by the first embodiment described above will be explained.

When a PVR (Personal Video Recorder) compliant with the UPnP protocol is connected onto a home IEEE (Institute of Electrical and Electronics) 802 network, a gateway device associated with the present invention makes the connected PVR open to the outside as a virtual SIP instance. An operational terminal on an out-of-home network becomes able to access the PVR at home by, e.g., establishing call connection using SIP to the virtual SIP instance.

Also, when an appliance is connected to the home network, the gateway device associated with the present invention registers the appliance in a category representing "appliances belonging to a home" and makes the category itself open to the out-of-home network as a virtual SIP instance. With this operation, the operational terminal on the out-of-home network becomes able to acquire list information of home appliances.

Second Embodiment of Present Invention

A second embodiment will explain a case wherein ECHONET is used as a control protocol for appliances on a home network. In this example, a communication medium for the home network is not specifically defined, and various network media such as IEEE802, Bluetooth, power lines, infrared rays, and the like can be used.

Figure 5:
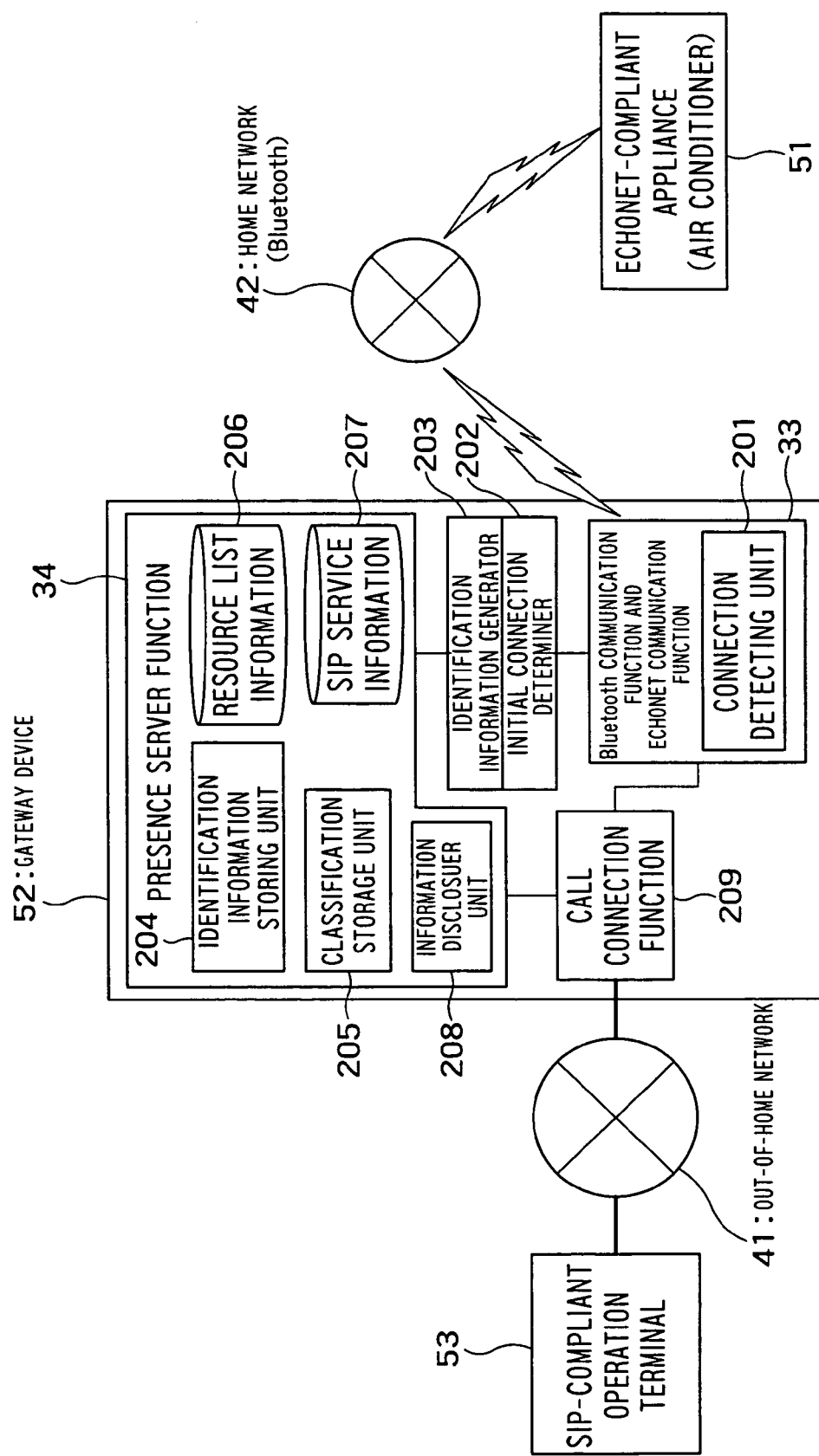
FIG. 5 is a diagram of a network configuration in which a gateway device according to a second embodiment of the present invention is used.

FIG. 5 is a diagram showing a network configuration in which a gateway according to the second embodiment is used.

For example, the Internet is assumed as an out-of-home network 41.

A home network 42 is a Bluetooth network, and an air conditioner 51 compliant with an ECHONET protocol is connected to the home network 42.

A gateway device 52 associated with the present invention lies between the out-of-home network 41 and the home network 42.

When the air conditioner 51 is connected to the home network 42 and becomes ready for access through IP using a PAN (Personal Area Network) profile which implements a TCP/IP protocol on Bluetooth, it sends a broadcast packet by the ECHONET protocol indicating that it is connected as an ECHONET appliance. This is equivalent to an SSDP alive packet in the case of the UPnP protocol.

A connection detecting unit 201 in the gateway device 52 recognizes by receiving the broadcast packet that the air conditioner 51 is connected to the home network 42. Operation of an initial connection determiner 202 follows the example in the first embodiment.

An identification information generator 203 in the gateway device 52 acquires a Bluetooth address of the air conditioner 51 from the appliance 51. A Bluetooth address (BT address) is an invariant globally unique identifier given to a Bluetooth appliance and is similar to a MAC (Media Access Control) address in an IEEE802 network. The identification information generator 203 uses the Bluetooth address value and an AOR (Address Of Records) given to a user who uses a SIP domain to generate a GRUU (Globally Routable UA URI). To make a GRUU include a readable string, a goodsname value representing a model name of an appliance and an EOJ (ECHONET Object) code representing a type of the appliance in the ECHONET protocol are used, like the case of UPnP in the first embodiment wherein the deviceType of the Device Description Document is used. For example, if the goodsname is "AC100JP," and the EOJ code is "0x013001," it is found from the EOJ code that a type of an ECHONET object is an air conditioner. There can be considered a method of generating a GRUU as "ac100jp-kkirufa12a135@sip-example.com" using these values if a hash value generated from a GRUU and AOR is "kkirufa12a135," and a domain name is "sip-example.com."

The gateway device 52 registers the GRUU in a presence server function 34 and manages the GRUU. This makes it possible to consider, as a virtual SIP appliance, the air conditioner 51 which is an ECHONET appliance and allows a SIP-compliant operation terminal 53 on the out-of-home network 41 to access the air conditioner 51.

A call connection function 209 in the gateway device 52 establishes call connection with the SIP-compliant operation terminal 53 in response to a request for call connection with a GRUU from the SIP-compliant operation terminal 53 connected to the out-of-home network 41. The gateway device 52 mediates communication (including protocol conversion) between the SIP-compliant operation terminal 53 with which it has established the call connection and the ECHONET-compliant appliance related to the request for call connection.

An identification information storing unit 204, classification storage unit 205, resource list information 206, SIP service information 207, and information disclosure unit 208 of the presence server function 34 in the gateway device 52 are the same as those in the first embodiment, and an explanation thereof will be omitted.

This embodiment is characterized by the following point. When a gateway device receives a broadcast packet sent when an ECHONET appliance is connected to a network, it determines whether the appliance is connected for the first time. If the gateway device determines that the appliance is newly connected, it classifies the appliance by control protocol (e.g., ECHONET) and registers the appliance in a presence server (gateway device itself) as accessible information in a SIP framework.

Figure 6:
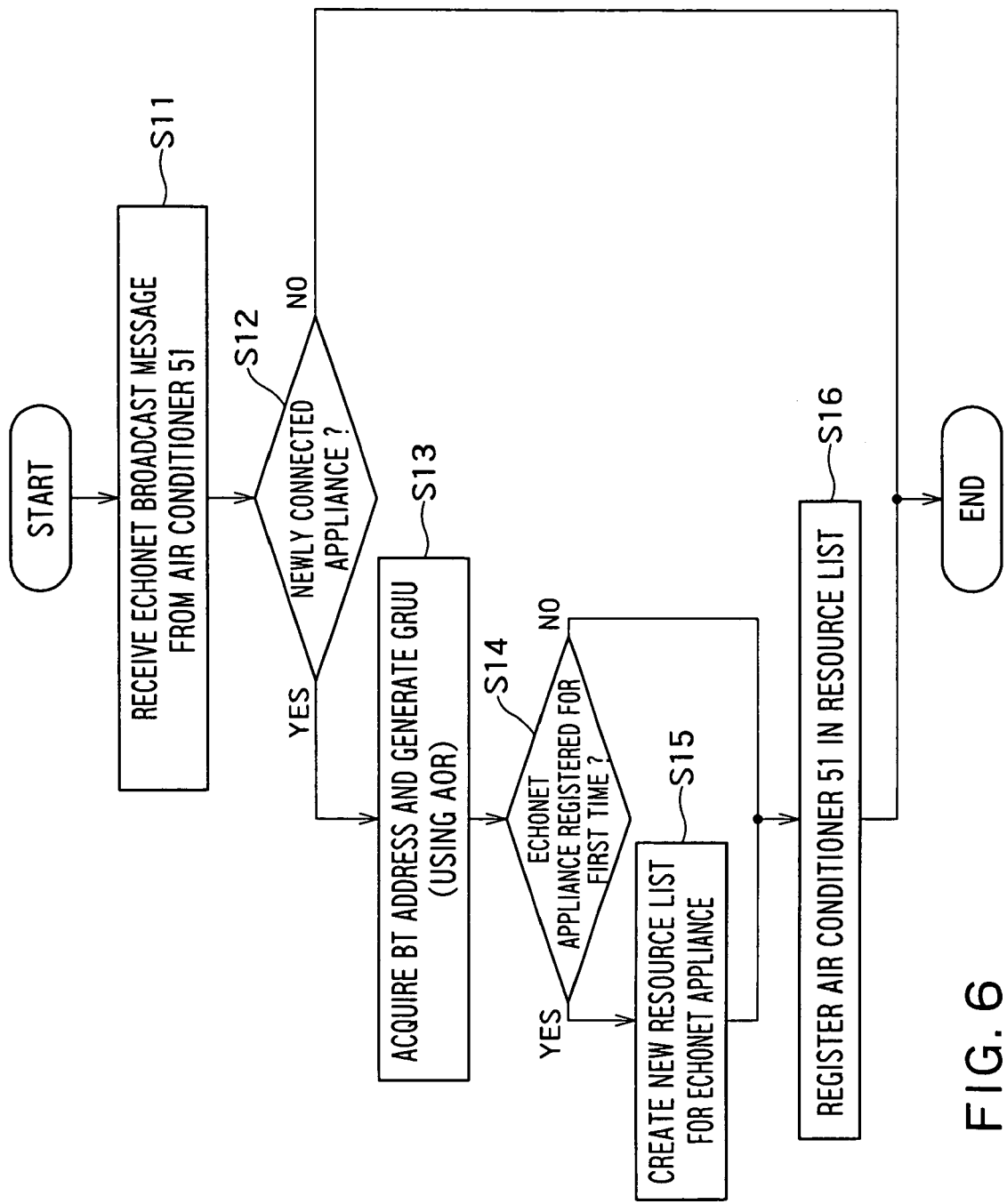
FIG. 6 is a flowchart for explaining operation of the gateway device according to the second embodiment of the present invention.

FIG. 6 shows an operation sequence of the gateway device according to the second embodiment.

When the connection detecting unit 201 in the gateway device 52 receives an ECHONET broadcast message from the air conditioner (ECHONET-compliant appliance) 51 (step S11), it determines on the basis of, e.g., the resource list information 206 whether a new appliance is connected onto the home network 42 (step S12).

If no new appliance is connected, i.e., an appliance in question is already registered in the resource list information 206, the process ends (NO in step S12). On the other hand, if it is determined that a new appliance is connected (YES in step S12), the identification information generator 203 acquires a BT address from the received message and generates a GRUU (step S13). The identification information generator 203 registers the generated GRUU in the identification information storing unit 204.

The presence server function 34 determines whether the newly detected appliance is a first ECHONET appliance, i.e., whether a resource list for ECHONET ("echonet-appliances") is already registered in the resource list information 206 or classification storage unit 205 (step S14).

If the resource list for ECHONET is not yet present in the resource list information 206 or classification storage unit 205 (YES in step 514), a new source list for ECHONET appliances is generated, and the generate resource list is added to the resource list information 206 (step S15). Also, the presence server function 34 adds information on the air conditioner 51 to a classification table (step S15).

After that, or if the resource list for ECHONET is already registered in step S14 (NO in step S14), the presence server function 34 registers the newly detected air conditioner 51 in the ECHONET resource list in the resource list information 206 (step S16). Also, the classification storage unit 205 adds the information on the air conditioner 51 to the classification table (step S16).

As described above, according to the second embodiment, when an air conditioner compliant with the ECHONET protocol is connected onto a home Bluetooth network, a gateway device associated with the present invention detects the connection of the air conditioner and makes the air conditioner open to the outside as a virtual SIP instance. This allows an appliance on an out-of-home network to access an air conditioner at home by, e.g., establishing call connection using SIP in the same manner as in the case of the PVR.

Third Embodiment of Present Invention

A third embodiment will explain a case wherein an IEEE1394 network is assumed as a home network, and AV/C is used as a control protocol for appliances on the IEEE1394 network.

Figure 7:
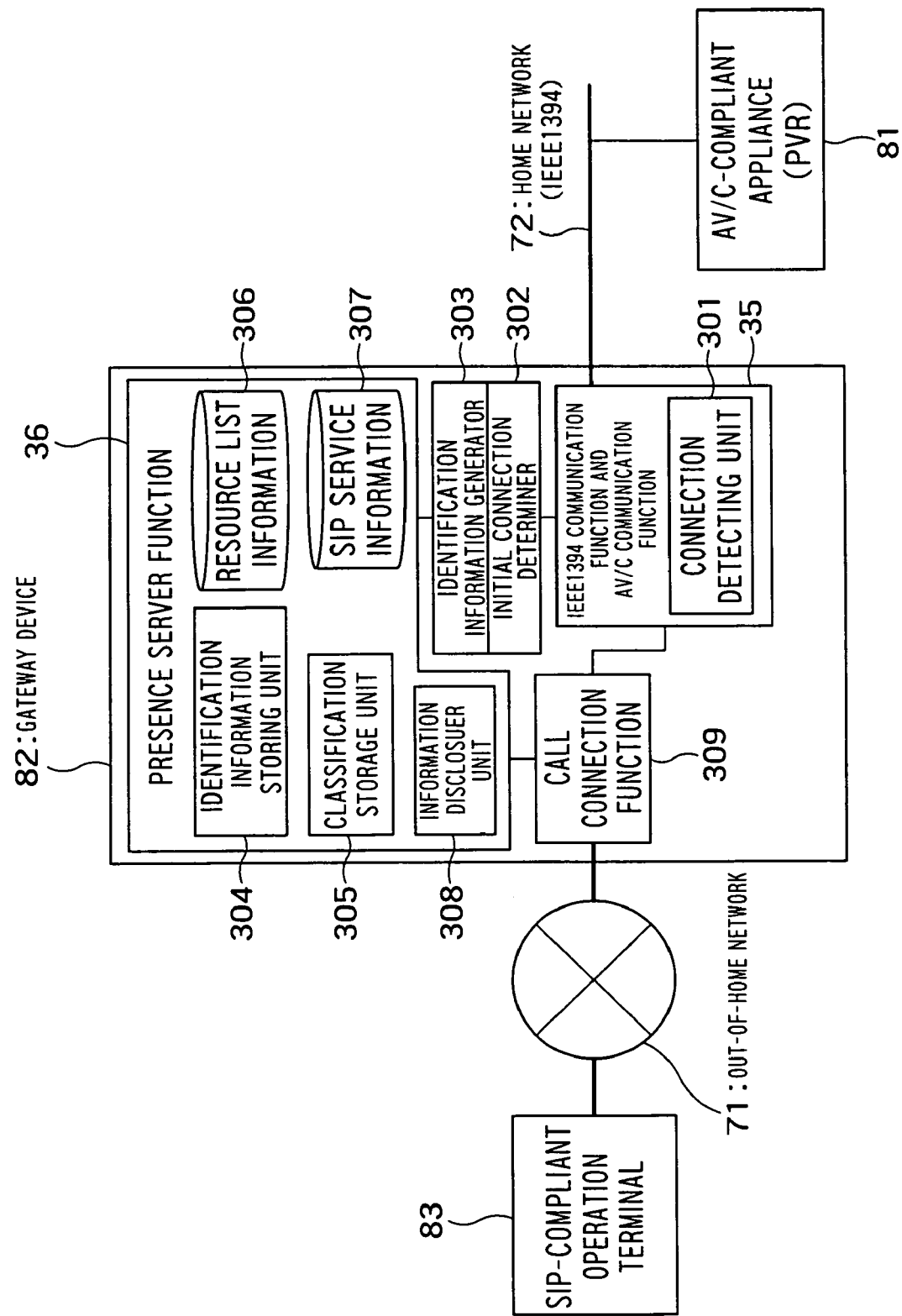
FIG. 7 is a diagram of a network configuration in which a gateway device according to a third embodiment of the present invention is used.

FIG. 7 is a diagram showing a network configuration including a gateway device according to the third embodiment.

For example, the Internet is assumed as an out-of-home network 71.

A home network 72 is an IEEE1394 network, and a PVR 81 compliant with an AV/C protocol is connected to the home network 72.

A gateway device 82 associated with the present invention lies between the out-of-home network 71 and the home network 72.

When the PVR 81 is connected to the home network 72, a bus reset occurs in the home network 72. A connection detecting unit 301 of an IEEE1394 communication function and AV/C communication function 35 in the gateway device 82 detects the bus reset and detects that the PVR 81 is newly connected. For this purpose, the gateway device 82 needs to store, in advance, information on each 1394 appliance connected to the home network and know information of a difference in connected appliances between before and after the bus reset. More specifically, the connection detecting unit 301 in the third embodiment detects the bus reset and knows the newly connected appliance by comparing the 1394 appliance information with that before the bus reset.

An identification information generator 303 uses an EUI64 value instead of the UUID in the first embodiment to generate a GRUU. An EUI64 value is also a time-invariant and globally unique identifier. A method of registering and managing a GRUU follows the example in the first embodiment.

A call connection function 309 in the gateway device 82 establishes call connection with a SIP-compliant operation terminal 83 connected to the out-of-home network 71 in response to a request for call connection with a GRUU from the SIP-compliant operation terminal 83. The gateway device 82 mediates communication (including protocol conversion) between the SIP-compliant operation terminal 83 with which it has established the call connection and the AV/C-compliant appliance related to the request for call connection.

An identification information storing unit 304, classification storage unit 305, resource list information 306, SIP service information 307, and information disclosure unit 308 of a presence server function 36 in the gateway device 82 are the same as those in the first embodiment, and an explanation thereof will be omitted.

This embodiment is characterized by the following point. When a bus reset occurs in an IEEE1394 network, a gateway device determines that an AV/C appliance is newly connected. The gateway device classifies the AV/C appliance by control protocol (e.g., AV/C) and registers the appliance in a presence server (gateway device itself) as accessible information in a SIP framework.

Figure 8:
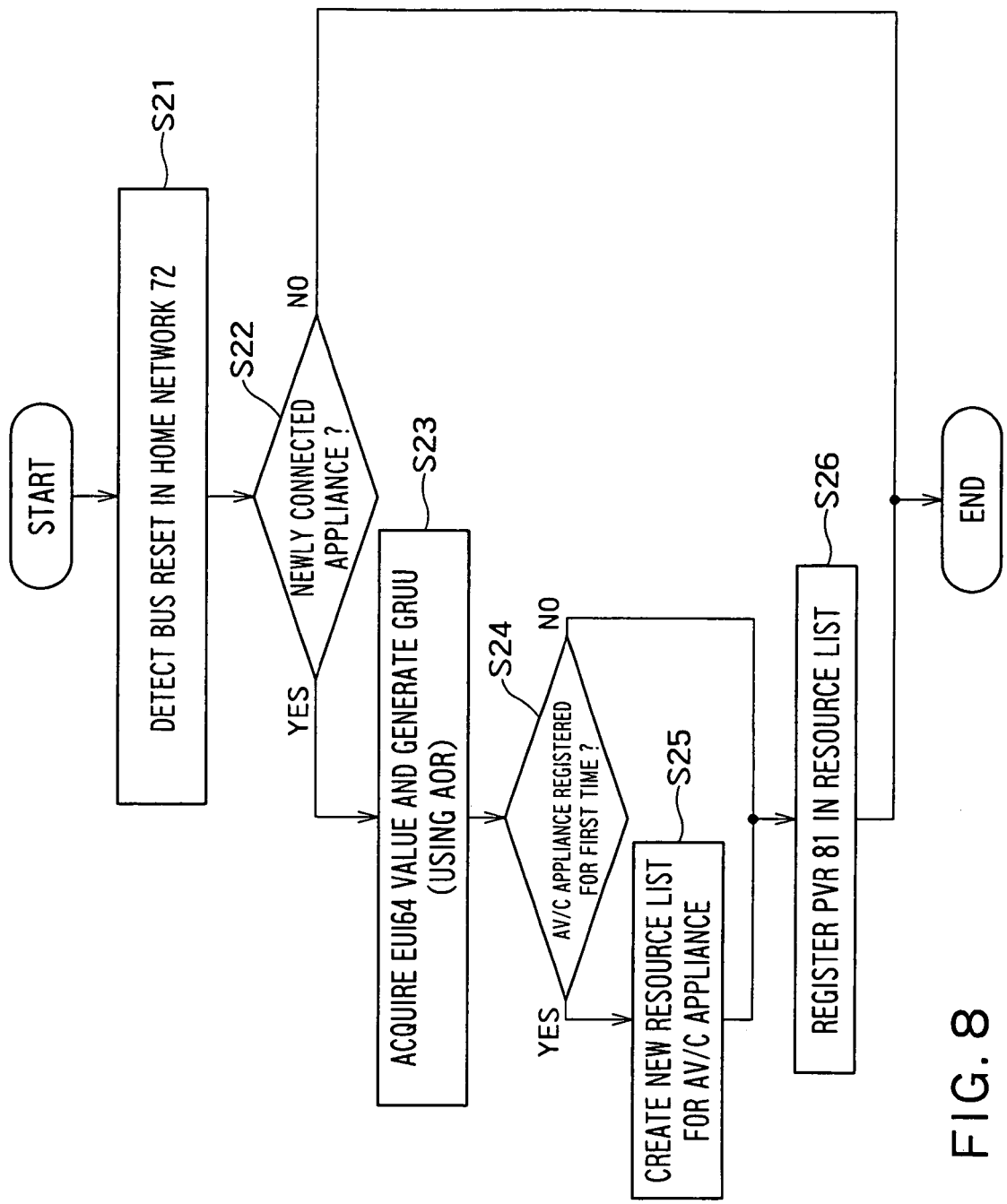
FIG. 8 is a flowchart for explaining operation of the gateway device according to the third embodiment of the present invention.

FIG. 8 shows an operation sequence of the gateway device according to the third embodiment.

When the connection detecting unit 301 in the gateway device 82 detects a bus reset in the home network 72 (step S21), it determines on the basis of appliance information before and after the bus reset whether a new appliance is connected onto the home network 72 (step S22).

If no new appliance is connected, the process ends (NO in step S22). On the other hand, it is determined that a new appliance is connected (YES in step S22), the identification information generator 303 generates a GRUU on the basis of an EUI64 value (step S23). The identification information generator 303 registers the generated GRUU in the identification information storing unit 304.

The presence server function 36 determines whether the newly detected appliance is a first AV/C appliance, i.e., whether a resource list for AV/C ("av/c-appliances") is already registered in the resource list information 306 or classification storage unit 305 (step S24).

If the resource list for AV/C is not yet present in the resource list information 306 or classification storage unit 305 (YES in step S24), a new resource list for AV/C appliances is generated, and the generated resource list is added to the resource list information 306 (step S25).

After that, or if the resource list for AV/C is already registered in step S24 (NO in step S24), the presence server function 36 registers the newly detected PVR 81 in the AV/C resource list in the resource list information 306 (step S26). Also, the classification storage unit 305 adds information on the PVR 81 to a classification table (step 526).

As described above, according to the third embodiment, it becomes possible to access a PVR compliant with the AV/C protocol on a home IEEE1394 network by, e.g., establishing call connection using SIP from the outside in the same manner as in the case of the UPnP appliance or ECHONET appliance described above.

Fourth Embodiment of Present Invention

A fourth embodiment will explain a case wherein an IEEE802 network is assumed as a home network, and a SIP-compliant appliance is used as a home appliance.

Figure 9:
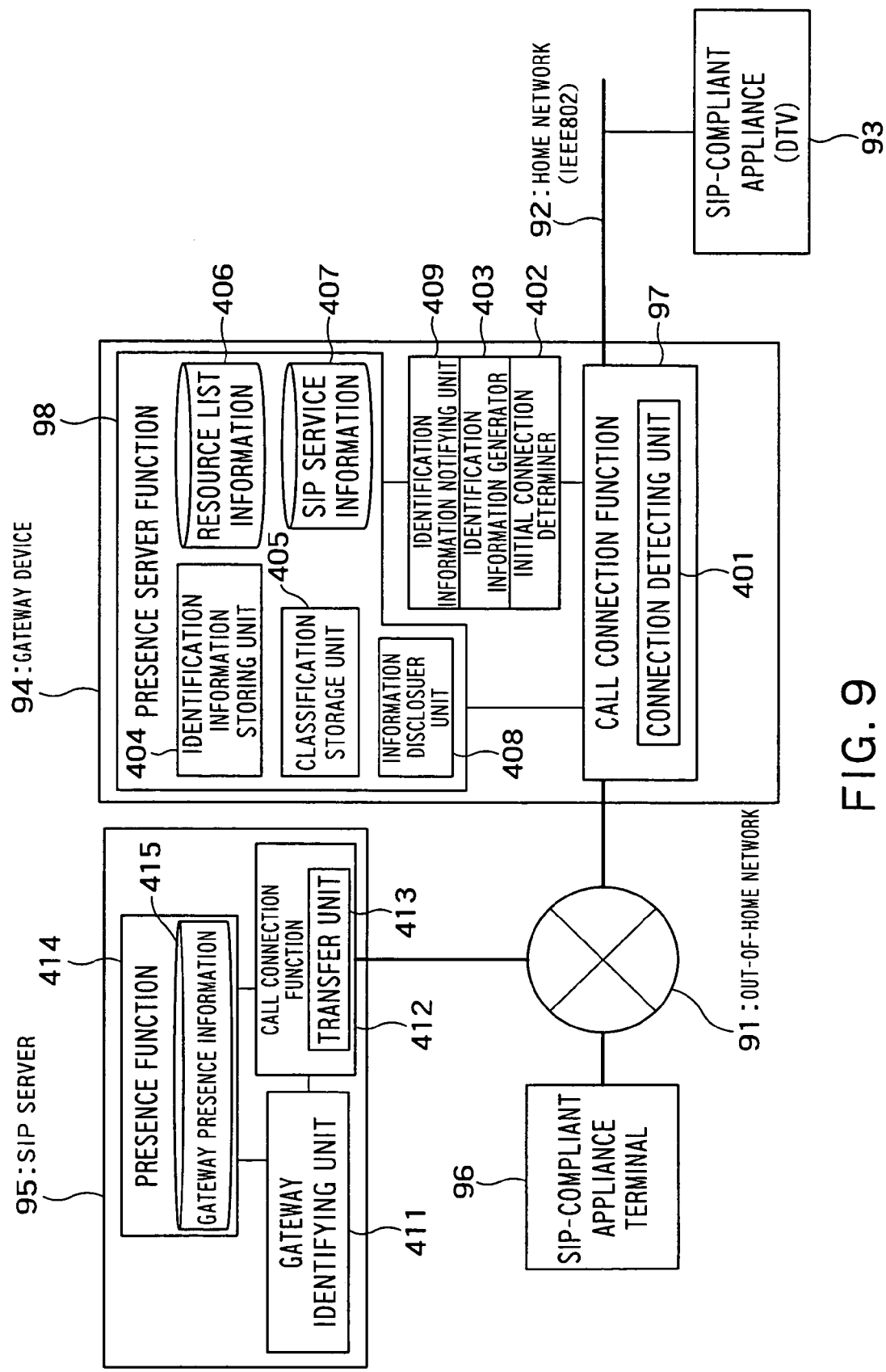
FIG. 9 is a diagram of a network configuration in which a gateway device according to a fourth embodiment of the present invention is used.

FIG. 9 is a diagram showing a network configuration in which a gateway device according to the fourth embodiment is used.

For example, the Internet is assumed as an out-of-home network 91.

A home network 92 is an IEEE802 network, and a SIP-compliant DTV (digital television) 93 is connected to the home network 92.

A gateway device 94 associated with the present invention lies between the out-of-home network 91 and the home network 92. A call connection function 97 in the gateway device 94 has a function of establishing call connection between a SIP-compliant operation terminal 96 and the DTV 93.

A SIP server 95 for registering SIP appliances resides on the out-of-home network 91.

This embodiment is based on the premise that setting of an IP address of the DTV 93, DNS (Domain Name Service) setting, and the like are automatically performed in advance.

Figure 10:
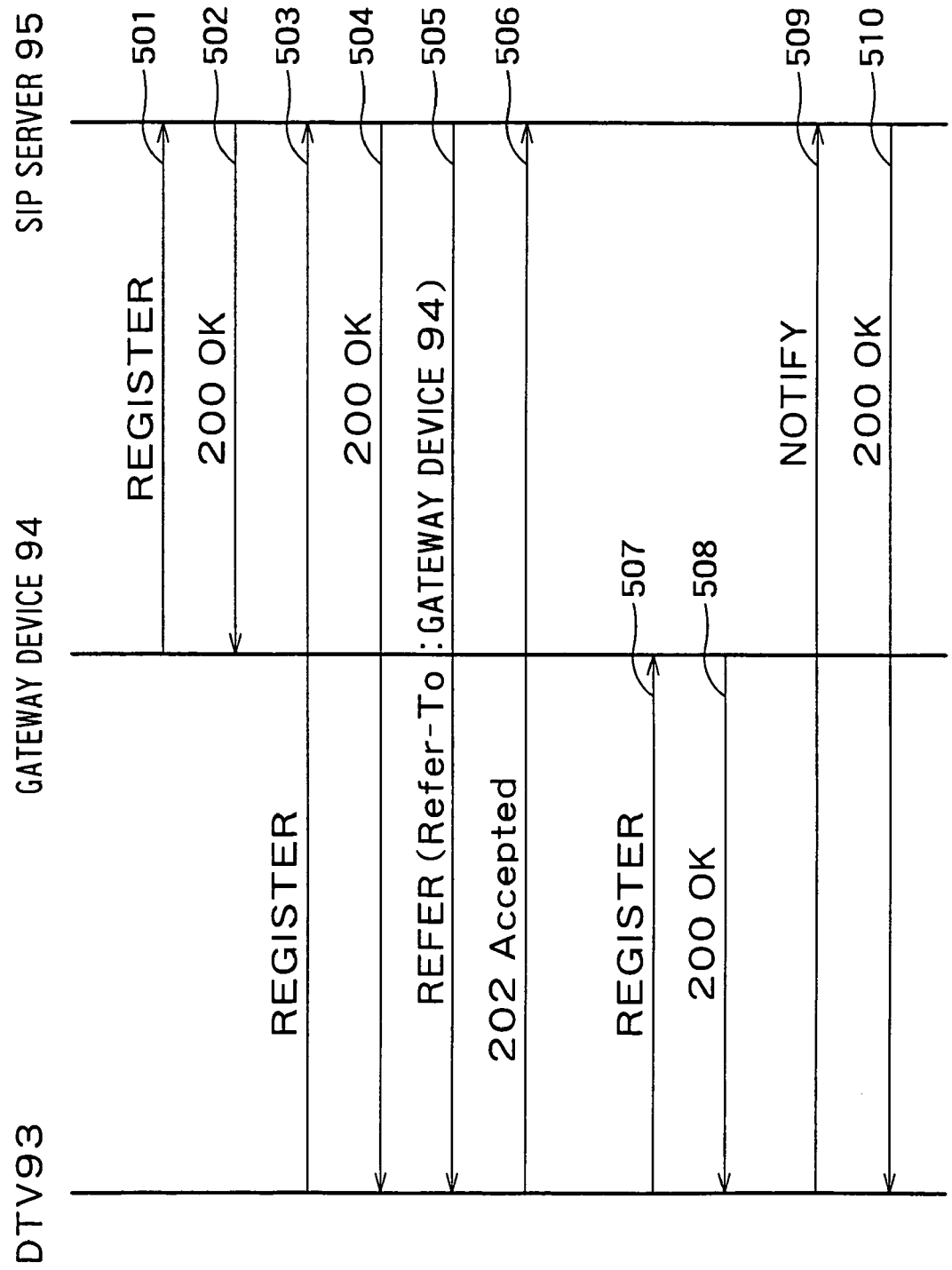
FIG. 10 is a sequence diagram for explaining operation of the network according to the fourth embodiment of the present invention.

FIG. 10 shows an operation sequence of a system according to the fourth embodiment.

When the gateway device 94 is connected to the out-of-home network 91 for the first time, it registers itself in the SIP server 95. The gateway device 94 generates a GRUU from an AOR used in the home network 92 and a hardware address of itself and registers a value of the GRUU in the SIP server 95. A REGISTER method or PUBLISH method according to SIP is used in this registration processing. Assume that a REGISTER request 501 is sent to the SIP server 95, and a 200 OK response 502 is received.

Then, the DTV 93 is connected to the home network 92. Information necessary for automatic registration such as an address of the SIP server 95 is set in the DTV 93 in advance. The connection acts as a trigger to send a REGISTER request 503 to the SIP server 95. A BODY message contained in the REGISTER request 503 may contain some appliance information to be registered (e.g., presence information) or may contain nothing. If the BODY message contains appliance information, an extended format of PIDF (Presence Information Data Format) can be used, for example. A message example of the REGISTER request 503 is shown below (header information and the like will be partially omitted). In this example, a header value of "Supported:pnp" is defined and inserted to notify the SIP server 95 that the registration is intended to implement Plug and Play.

```
REGISTER sip:sip.server@outside.com SIP/2.0
To: <sip:sip.server@outside.com>;tag=444555666
From:
<sip:dtv.serialno.000345a1b2c3@sip-example.com>;tag=111222333
Call-ID: 72727272@sip-example.com
CSeq: 1111 REGISTER
Max-Forwards: 70
Supported: pnp
Contact: <sip:dtv.serialno.000345a1b2c3@sip-example.com>
Expires: 3600
Content-Length: 0
```

Upon receipt of the REGISTER request 503, the SIP server 95 recognizes from source address information by means of a gateway identifying unit 411 that the DTV 93 is an appliance connected to the home network 92 to which the gateway device 94 belongs and sends a 200 OK response 504 to the DTV 93. An example of the response message 504 to the REGISTER request 503 is shown below (header information and the like will be partially omitted).

```
SIP/2.0 200 OK
To:                                             <sip:
sip:dtv.serialno.000345a1b2c3@sip-example.com>;tag=111222333
From: <sip:sip.server@outside.com>;tag=444555666
Call-ID: 72727272@abcdefghijk
CSeq: 1111 REGISTER
Max-Forwards: 70
Contact: sip:sip.server@outside.com
Expires: 3600
Content-Length: 0
```

The gateway identifying unit 411 compares address information (e.g., an IP address) acquired from the REGISTER request 501 from the gateway device 94 with address information (e.g., an IP address) acquired from the REGISTER request 503 from the SIP appliance on the home network 92. With this comparison, the gateway identifying unit 411 recognizes that the SIP appliance is an appliance connected to the home network 92 to which the gateway device 94 belongs. For this reason, the SIP server 95 needs to manage address information of the registered gateway device 94. FIG. 11 shows an example of a format of gateway information managed on the SIP server 95. The gateway information is managed as presence information 415 in a presence function 414 in the SIP server 95.

Then, the SIP server 95 sends a REFER request 505 to the DTV 93. A Refer-To header of the request contains an address of the gateway device 94. More specifically, a transfer unit 413 in a call connection function 412 of the SIP server 95 transfers access from the DTV 93 to the gateway device 94. A message example of the REFER request 505 is shown below (information such as a header will be partially omitted).

```
REFER         sip:dtv.serialno.000345a1b2c3@sip-example.com
SIP/2.0
To:                                             <sip:
sip:dtv.serialno.000345a1b2c3@sip-example.com>; tag=123456789
From: <sip:sip.server@outside.com>;tag=112233445
Call-ID: 898989898@abcdefghijk
CSeq: 93809824 REFER
Max-Forwards: 70
Refer-To: sip:gateway@sip-example.com
Contact: sip:sip.server@outside.com
Content-Length: 0
```

The DTV 93 refers to the Refer-To header of the REFER method 505 and sends in return a "202 Accepted" response 506. After that, the DTV 93 sends a REGISTER request 507 to the gateway device 94 and performs registration processing again. A message example of the REGISTER request 507 is shown below (header information and the like will be partially omitted). In the example below, to request the gateway device 94 to generate a GRUU, a "Supported:gruu" header is inserted

---

REGISTER sip:gateway@sip-example.com SIP/2.0
To: <sip:gateway@sip-example.com>
From:
<sip:dtv.serialno.000345a1b2c3@sip-example.com>;tag=123123123
Supported: gruu
Call-ID: 81818181@sip-example.com
CSeq: 1234 REGISTER
Max-Forwards: 70
Contact: <sip:dtv.serialno.000345a1b2c3@192.168.0.55>
    ;+sip.instance="<urn:uuid:ffeeffee-5dec-22e1-b432-112233445566>"
Content-Length: 0

---

Upon receipt of the REGISTER request 507, a connection detecting unit 401 in the gateway device 94 acquires global identification information such as hardware address information of the DTV 93 and determines whether the DTV 93 is initially connected. If the DTV 93 is initially connected, the gateway device 94 generates a GRUU by means of an identification information generator 403. The identification information generator 403 registers the generated GRUU in an identification information storing unit 404, and an identification information notifying unit 409 notifies the DTV 93 of the GRUU as a response 508 to the REGISTER request 507. A message example of the REGISTER response 508 is shown below (header information and the like will be partially omitted).

---

SIP/2.0 200 OK
To:
<sip:dtv.serialno.000345a1b2c3@sip-example.com>;tag=123123123
From: <sip:gateway@sip-example.com>;tag=456456456
Call-ID: 81818181@sip-example.com
CSeq: 1234 REGISTER
Contact: <sip:gateway@192.168.0.10>
    ;gruu="sip:dtv.apsyukl234734adfd@sip-example.com"
    ;+sip.instance="<urn:uuid:ffeeffee-5dec-22e1-b432-112233445566>"
    ;expires=3600
Content-Length: 0

---

If the registration processing is successful, the DTV 93 notifies the SIP server 95 of that effect by using a NOTIFY request 509. The SIP server 95 sends in return a 200 OK response 510 to the DTV 93. A message example of the NOTIFY request 509 is shown below (header information and the like will be partially omitted).

---

NOTIFY sip:sip.server@outside.com SIP/2.0
To: <sip:sip.server@outside.com>;tag=112233445
From:
<sip:dtv.serialno.000345a1b2c3@sip-example.com>;tag=123456789
Call-ID: 898989898@abcdefghijk
CSeq: 1020304 NOTIFY
Max-Forwards: 70
Event: refer;id=99999999
Subscription-State: terminated;reason=noresource
Contact: sip:dtv.serialno.000345a1b2c3@sip-example.com -continued Content-Type: message/sipfrag;version=2.0
Content-Length: 16
SIP/2.0 200 OK

---

If the registration is successful, "message/sipfrag" is designated as a MIME type and "SIP/2.0 200 OK" is contained, in a BODY message of the NOTIFY request 509.

As another method, there can be considered a method in which the SIP server 95 sends a REFER request not to the DTV 93 but to the gateway device 94.

If a method of registering and managing a GRUU follows the example in the first embodiment, a SIP appliance connected to the home network 92 is grouped as a home appliance by the gateway device 94, like the non-SIP-compliant appliance shown in the first, second, or third embodiment. The SIP appliance can be referred to from the out-of-home network 91 using a presence mechanism.

The call connection function 97 in the gateway device 94 establishes call connection with the SIP-compliant operation terminal 96 in response to a request for call connection with a GRUU from the SIP-compliant operation terminal 96 connected to the out-of-home network 91. The call connection function 97 also establishes call connection with a SIP-compliant appliance related to the request for call connection. The gateway device 82 mediates communication between both the appliances with each of which it has established the call connection, i.e., the SIP-compliant operation terminal 96 and the SIP-compliant appliance.

The identification information storing unit 404, a classification storage unit 405, resource list information 406, SIP service information 407, and an information disclosure unit 408 of a presence server function 98 in the gateway device 94 are the same as those in the first embodiment, and an explanation thereof will be omitted.

In the above explanation, the DTV 93 in the home network 92 first sends a REGISTER request (unicast packet for registration) to the SIP server 95. However, the DTV 93 may send it directly to the gateway device 94.

The above-described method of using REFER method and REGISTER method according to the fourth embodiment is a technique being standardized by the IETF. This embodiment is characterized by the following points. The first point is that a SIP server having received a REGISTER request knows a gateway device on a local network to which a source appliance belongs and prompts the source appliance to be registered in the gateway device. The second point is that the gateway device classifies a SIP appliance having sent a REGISTER request by control protocol (e.g., SIP) and registers the SIP appliance in a presence server (gateway device itself) as accessible information in a SIP framework.

As described above, according to the fourth embodiment, even if a SIP-compliant appliance is connected to a home network, collaboration between a SIP server for registration on an out-of-home network and a gateway device makes it possible to categorize the SIP-compliant appliance as a "home appliance" and operate it from the out-of-home network without manual setting of the SIP-compliant appliance.

Fifth Embodiment of Present Invention

A fifth embodiment will explain an example wherein a gateway device includes a communication interface for supporting all of the home networks in the first, second, third, and fourth embodiments. More specifically, the fifth embodiment will explain a case wherein an IEEE802, Bluetooth, and IEEE1394 networks are mixed with each other.

Figure 12:
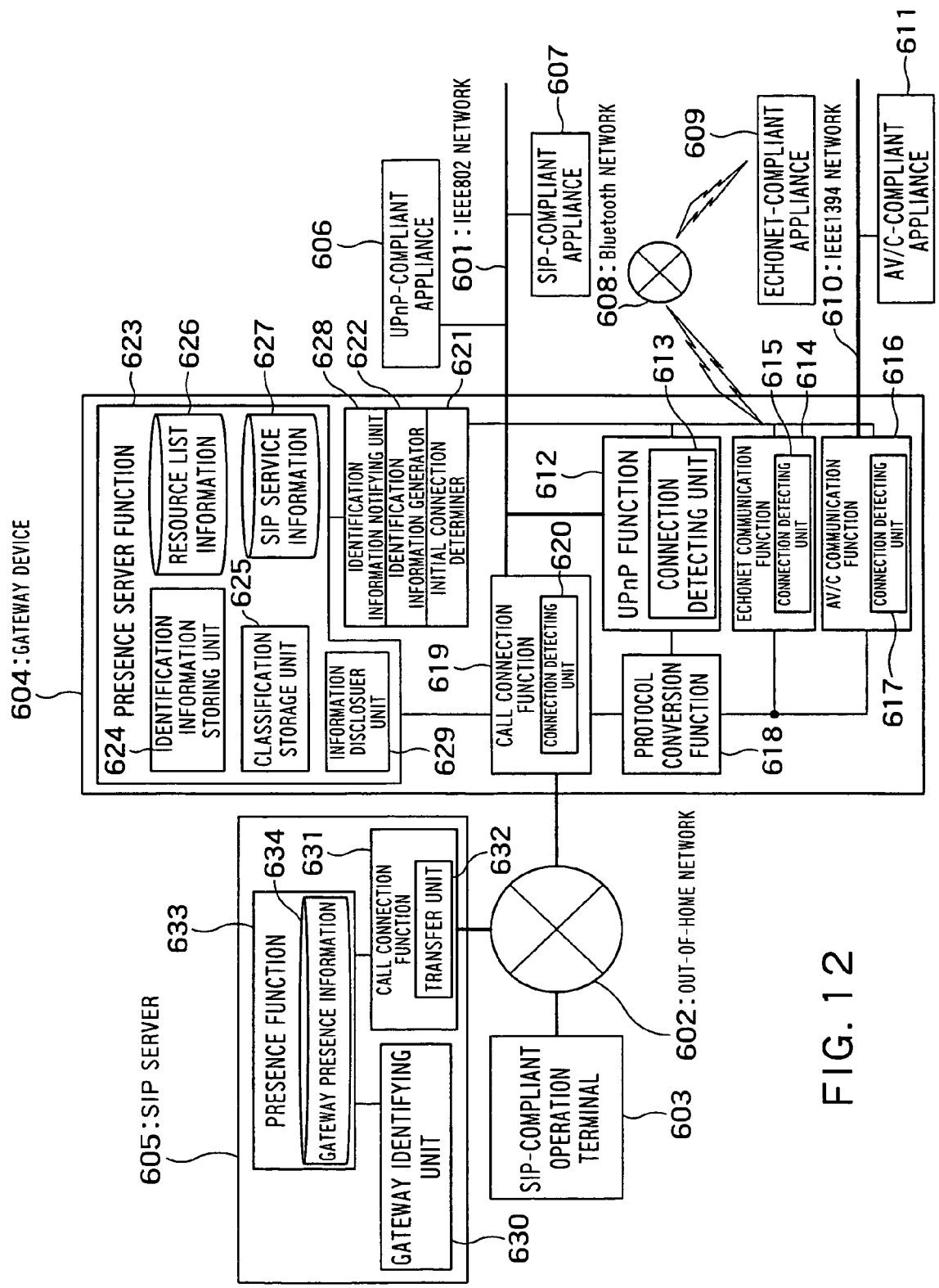
FIG. 12 is a diagram of a network configuration in which a gateway device according to a fifth embodiment of the present invention is used.
Figure 13:
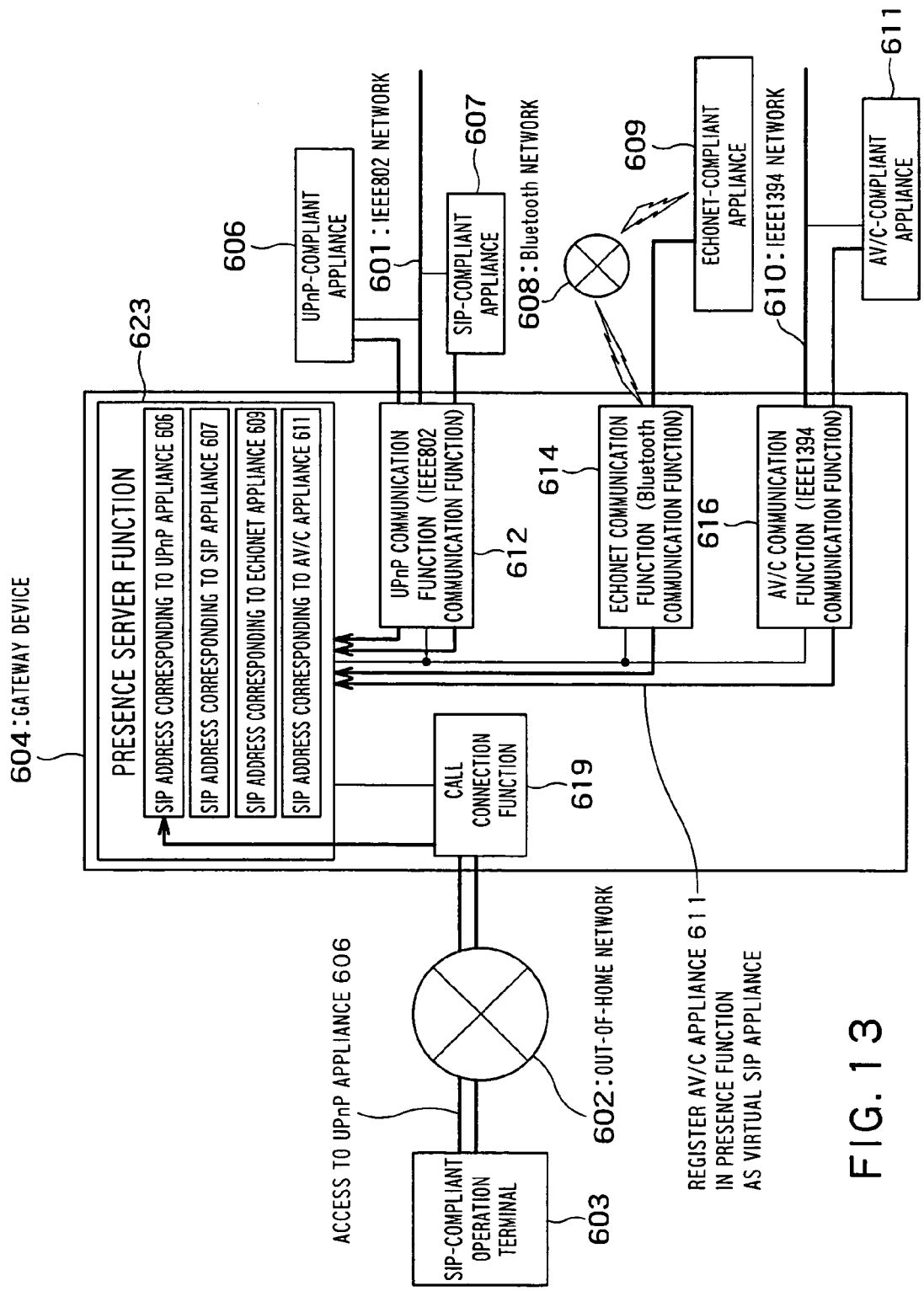
FIG. 13 is a diagram showing an example of a gateway function which makes a non-SIP-compliant appliance on a home network look like a virtual SIP instance.
Figure 14:
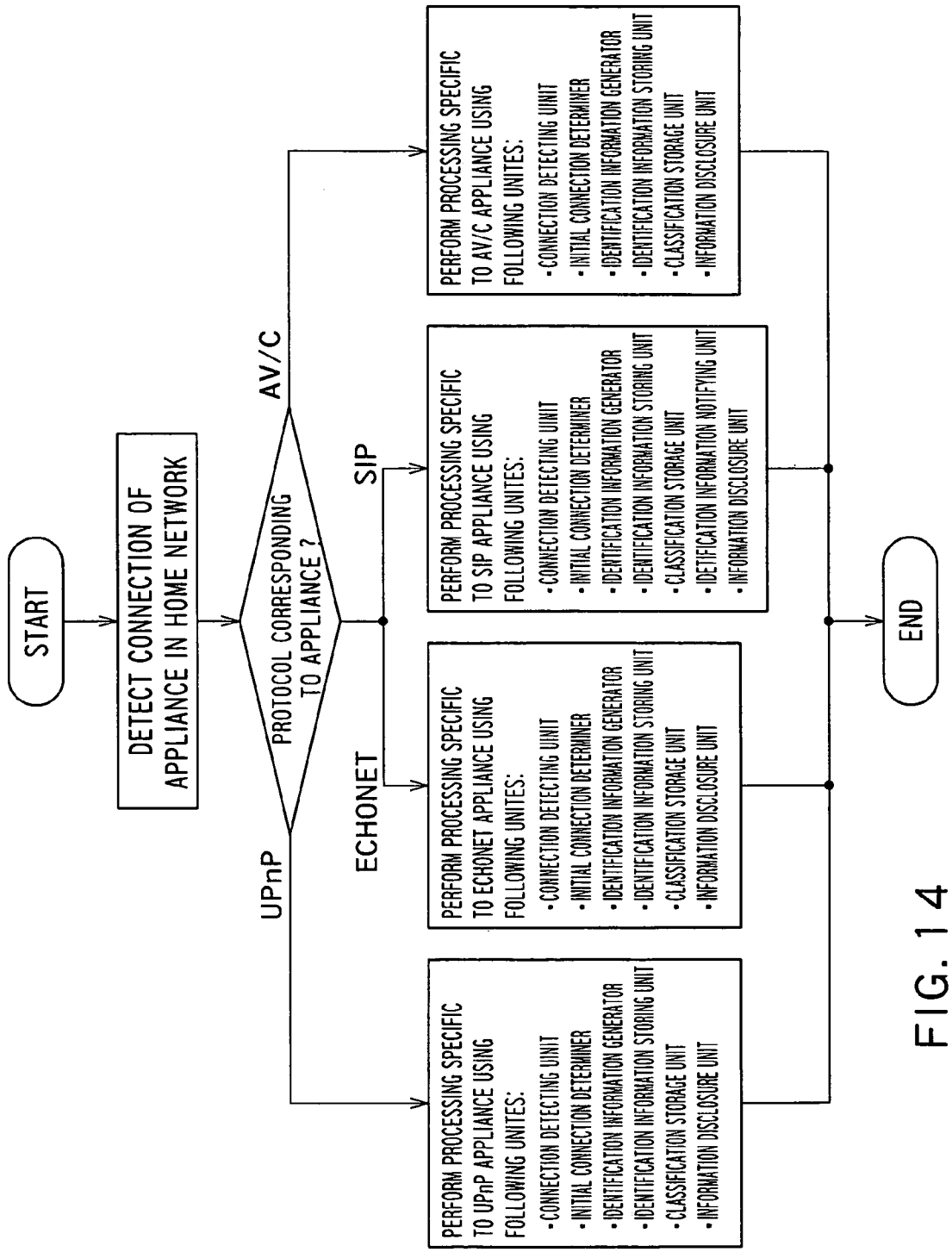
FIG. 14 is a flowchart for explaining basic operation of the gateway device.

FIG. 12 is an overall diagram of a network configuration which includes a gateway device according to the fifth embodiment. FIG. 13 is a diagram showing a function of the gateway device in FIG. 12 which makes an appliance on a home network look like a virtual SIP instance to an out-of-home network. FIG. 14 is a flowchart showing basic operation of the gateway device in FIG. 12.

As shown in FIG. 12, the first to fourth embodiments can coexist. Remote control services corresponding to control protocols on home networks 601, 608, and 610 are described in SIP service information (RLS Services Document) 627, and a corresponding protocol conversion function 618 is installed on a gateway device 604. With this configuration, appliances compliant with various networks and control protocols can be remotely controlled just by connecting the appliances to the networks. Note that each of the UPnP Control Point function 31 in the first embodiment, the Bluetooth communication function and ECHONET communication function 33 in the second embodiment, and the IEEE1394 communication function and AV/C communication function 35 in the third embodiment has a function corresponding to the protocol conversion function. A detailed operation example of the gateway device 604 in FIG. 12 is a fusion of the first to fourth embodiments, and an explanation thereof will be omitted.

As described above, according to the fifth embodiment, when an appliance is connected to a home network, a gateway device associated with the present invention determines a control protocol (UPnP, ECHONET, or AV/C) compliant with the appliance, registers the appliance in a category representing "appliances supporting the control protocol," and makes the category itself open to an out-of-home network as a virtual SIP instance. When an operation terminal on the out-of-home network accesses the virtual SIP instance on the gateway device corresponding to the appliance on the home network, the gateway device activates an application supporting the control protocol with which the appliance complies, thereby it is possible to perform processing specific to the control protocol.

What is claimed is:

1. A gateway device which connects a first network and at least one second network and performs communication based on a call control protocol with a terminal device on the first network, comprising:
    a connection detecting unit which detects appliances on the at least one second network;
    an identification information generator which generates identification information of each of the detected appliances for identifying by the call control protocol each of the detected appliances;
    a classification unit which groups the detected appliances according to at least either control protocols with which the detected appliances comply or the second networks to which the detected appliances belong such that appliances complying with same control protocol belong to same category group or appliances belonging to same second network belong to same category group;
    a storage unit which stores the identification information of the detected appliances while associating the identification information of the detected appliances with respective category groups;
    an information publishing unit which, upon receipt of an information subscription request according to the call control protocol from the terminal device on the first network, publishes for the terminal device on the first network, of the control protocols or the second networks to the terminal device, and upon receipt of data designating one of the control protocols or the second networks, publishes for the terminal device identification information of appliances which is included in the group of the designated one;
    a call connection unit which, upon receipt of a request for call connection with the identification information of an appliance according to the call control protocol from the terminal device on the first network, establishes call connection with the terminal device having made the request for call connection; and
    a mediation unit which mediates communication between the terminal device having made the request for call connection and the appliance on the second network assigned the identification information serving as a target of the request for call connection.

2. The gateway device according to claim 1, wherein the connection detecting unit detects the appliance by receiving a broadcast packet which the appliance on the second network sends on the basis of the control protocol with which the appliance complies.

3. The gateway device according to claim 2, wherein the broadcast packet contains information of the appliance which sends the broadcast packet, the information of the appliance being unique among appliances on the second network.

4. The gateway device according to claim 1, further comprising a registration unit which registers an appliance that performs communication based on the call control protocol on the second network, wherein
    the connection detecting unit detects an appliance on the second network which performs communication based on the call control protocol as the control protocol with which the appliance on the second network complies, by receiving a unicast packet for requesting the registration from the appliance on the second network.

5. The gateway device according to claim 4, further comprising an identification information notifying unit which notifies the appliance on the second network that performs communication based on the call control protocol of the identification information generated by the identification information generator.

6. The gateway device according to claim 4, wherein the unicast packet for requesting the registration contains information of the appliance which issues the unicast packet, the information of the appliance being unique among appliances on the second network.

7. The gateway device according to claim 1, wherein the identification information generator generates the identification information of the detected appliance which includes both of unique information of the detected appliance and basic address information given in advance for communication based on the call control protocol, the information of the detected appliance being unique among appliances on the second network.

8. The gateway device according to claim 1, wherein if a category representing the control protocol with which the detected appliance complies or the second network to which the detected appliance belongs is not created yet, the classification unit creates the category and registers the identification information of the detected appliance in the category, whereas if the category is already created, the classification unit registers the identification information of the detected appliance in the already created category.

9. The gateway device according to claim 1, wherein the call control protocol is SIP, and the control protocol used on the second network is one of a UPnP protocol, AV/C protocol, ECHONET protocol, and a combination of the protocols.

10. A network system comprising:
a gateway device which connects a first network and at least one second network and performs communication based on a call control protocol with a terminal device on the first network; and
a server device connected to the first network to register an appliance participant in communication based on the call control protocol,
the gateway device including
a connection detecting unit which detect appliances on the at least one second network,
an identification information generator which generates identification information for each of the detected appliances for identifying by the call control protocol each of the detected appliances,
a classification unit which groups the detected appliances according to at least either control protocols with which the detected appliances on the second network comply or second networks to which the detected appliances belong such that appliances complying with same control protocol belong to same category group or appliances belonging to same second network belong to same category group,
a storage unit which stores the identification information of the detected appliances while associating the identification information of the detected appliances with respective category groups,
an information publishing unit which, upon receipt of an information subscription request according to the call control protocol from the terminal device on the first network, publishes for the terminal device on the first network, identification information of the control protocols or the second networks to the terminal device, and upon receipt of data designating one of the control protocols or the second networks, publishes for the terminal device identification information of appliances which is included in the group of the designated one,
a call connection unit which, upon receipt of a request for call connection with the identification information of an appliance according to the call control protocol from the terminal device on the first network, establishes call connection with the terminal device having made the request for call connection, and
a mediation unit which mediates communication between the terminal device having made the request for call connection and the appliance on the second network assigned the identification information serving as a target of the request for call connection,
the server device including
a gateway specifying unit which, upon receipt of a unicast packet from the appliance on the second network which performs communication based on the call control protocol for requesting registration of the appliance, specifies a gateway device to which the appliance on the second network belongs, and
a transfer unit which sends out, to the appliance on the second network, instruction data giving an instruction to request the registration to the specified gateway device,
wherein the connection detecting unit in the gateway device detects the appliance on the second network by receiving a unicast packet for requesting the registration from the appliance on the second network.

11. The network system according to claim 10, wherein the server device further comprises an address storing unit which stores in advance an address of a gateway device, and
the gateway specifying unit specifies a gateway device to which the appliance on the second network belongs by comparing a source address of the unicast packet with an address in the address storing unit.

12. A communication program stored on a storage unit executed by a gateway device which connects a first network and at least one second network and performs communication based on a call control protocol with a terminal device on the first network, comprising:
detecting appliances on the at least one_second network;
generating identification information of each of the detected appliances for identifying by the call control protocol each of the detected appliances;
grouping the detected appliances according to at least either control protocols with which the detected appliances on the second network comply or second networks to which the detected appliances belong such that appliances complying with same control protocol belong to same category group or appliances belonging to same second network belong to same category group;
upon receipt of an information subscription request according to the call control protocol from the terminal device on the first network, publishing for the terminal device on the first network identification information of the control protocols or the second networks to the terminal device, and upon receipt of data designating one of the control protocols or the second networks, publishing for the terminal device identification information of appliances which is included in the group of the designated one;
upon receipt of a request for call connection with the identification information of an appliance according to the call control protocol from the terminal device on the first network, establishing call connection with the terminal device having made the request for call connection; and
mediating communication between the terminal device having made the request for call connection and the appliance on the second network assigned the identification information serving as a target of the request for call connection.

13. A communication method of implementing in a gateway device which connects a first network and at least one second network and performs communication based on a call control protocol with a terminal device on the first network, comprising:
detecting appliances on the at least one second network;
generating identification information of each of the detected appliances for identifying by the call control protocol each of the detected appliances;
grouping the detected appliances according to at least either control protocols with which the detected appliances comply or second networks to which the detected appliances belong such that appliances complying with the same control protocol belong to same category group or appliances belonging to same second network belong to same category group;
upon receipt of an information subscription request according to the call control protocol from the terminal device on the first network, publishing for the terminal device on the first network identification information of the control protocols or the second networks to the terminal device, and upon receipt of data designating one of the control protocols or the second networks, publishing for the terminal device identification information of appliances which is included in the group of the designated one;

upon receipt of a request for call connection with the identification information of an appliance according to the call control protocol from the terminal device on the first network, establishing call connection with the terminal device having made the request for call connection; and mediating communication between the terminal device having made the request for call connection and the appliance on the second network assigned the identification information serving as a target of the request for call connection.

* * * * *